United States Patent
Kim et al.

(10) Patent No.: US 9,854,381 B2
(45) Date of Patent: Dec. 26, 2017

(54) METHOD FOR TRANSMITTING DATA OF MTC DEVICE

(71) Applicant: LG Electronics Inc., Seoul (KR)

(72) Inventors: Jaehyun Kim, Seoul (KR); Laeyoung Kim, Seoul (KR); Taehyeon Kim, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/439,781

(22) PCT Filed: Nov. 1, 2013

(86) PCT No.: PCT/KR2013/009822
§ 371 (c)(1),
(2) Date: Apr. 30, 2015

(87) PCT Pub. No.: WO2014/069928
PCT Pub. Date: May 8, 2014

(65) Prior Publication Data
US 2015/0296321 A1    Oct. 15, 2015

Related U.S. Application Data

(60) Provisional application No. 61/721,495, filed on Nov. 2, 2012, provisional application No. 61/892,474, filed
(Continued)

(51) Int. Cl.
*H04W 72/10* (2009.01)
*H04W 4/00* (2009.01)
(Continued)

(52) U.S. Cl.
CPC ............. *H04W 4/005* (2013.01); *H04W 8/02* (2013.01); *H04W 28/0215* (2013.01);
(Continued)

(58) Field of Classification Search
CPC .. H04W 72/0446; H04W 72/10; H04W 4/005
See application file for complete search history.

(56) References Cited

U.S. PATENT DOCUMENTS

2012/0307632 A1* 12/2012 Guo ................. H04W 48/06
370/230
2013/0155954 A1* 6/2013 Wang ................. H04W 4/005
370/328
(Continued)

FOREIGN PATENT DOCUMENTS

| KR | 102120035896 | 4/2012 |
| KR | 1020120070523 | 6/2012 |
| WO | 2011112051 | 9/2011 |
| WO | 2012096490 | 7/2012 |

OTHER PUBLICATIONS

Rahul Vaidya et al., "Network Congestion Control: Mechanisms for Congestion Avoidance and Recovery," In: Proceedings of the 1st International Conference on Wireless Technologies for Humanitarian Relief (ACWR'11), Dec. 18-21, 2011, pp. 199-207, see pp. 202-204.

*Primary Examiner* — Andrew Chriss
*Assistant Examiner* — Voster Preval
(74) *Attorney, Agent, or Firm* — Dentons US LLP

(57) ABSTRACT

The present specification provides a method for transmitting data of a machine type communication (MTC) device. The method for transmitting data of an MTC device comprises the steps of: receiving a mobility management (MM) latency timer from a mobility management entity within a network; operating the MM latency timer; determining whether data to be transmitted is generated before the expiration of the MM latency timer; and transmitting the data to be transmitted through an uplink NAS message even though the MM latency timer has not expired when the data to be transmitted is generated.

12 Claims, 15 Drawing Sheets

Related U.S. Application Data on Oct. 18, 2013, provisional application No. 61/893,272, filed on Oct. 20, 2013, provisional application No. 61/894,375, filed on Oct. 22, 2013.

(51) Int. Cl.
*H04W 8/02* (2009.01)
*H04W 72/04* (2009.01)
*H04W 74/08* (2009.01)
*H04W 28/02* (2009.01)

(52) U.S. Cl.
CPC ... *H04W 28/0289* (2013.01); *H04W 72/0446* (2013.01); *H04W 72/10* (2013.01); *H04W 74/08* (2013.01); *H04W 74/085* (2013.01)

(56) References Cited

U.S. PATENT DOCUMENTS

| | | | |
|---|---|---|---|
| 2013/0301547 A1* | 11/2013 | Gupta | H04W 4/005 370/329 |
| 2013/0336218 A1* | 12/2013 | Gupta | H04W 4/005 370/328 |
| 2014/0016614 A1* | 1/2014 | Velev | H04W 4/005 370/331 |
| 2015/0085658 A1* | 3/2015 | Hong | H04W 28/0289 370/235 |
| 2017/0019750 A1* | 1/2017 | Palanisamy | H04W 76/066 |
| 2017/0150332 A1* | 5/2017 | Palanisamy | H04W 4/14 |

* cited by examiner

METHOD FOR TRANSMITTING DATA OF MTC DEVICE

This application is a 35 USC §371 National Stage entry of International Application No. PCT/KR2013/009822 filed on Nov 1, 2013, and claims priority to U.S. Provisional Application Nos. 61/721,495 filed on Nov. 2, 2012; 61/892,474 filed on Oct. 18, 2013; 61/893,272 filed on Oct. 20, 2013 and 61/894,375 filed on Oct. 22, 2013, all of which are hereby incorporated by reference in their entireties as if fully set forth herein.

BACKGROUND OF THE INVENTION

Field of the Invention

The present invention relates to a Machine Type Communication (MTC).

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |

TABLE 1-continued

| Reference point | Description |
| --- | --- |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3a is an exemplary diagram showing the structure of a radio interface protocol in a control plane between UE and an eNodeB, and FIG. 3b is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

Several layers are present in the second layer.

First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3a is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 4a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 4b illustrates a connection process in a radio resource control (RRC) layer.

FIG. 4b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, Machine Type Communications (MTC) have been discussed in recent years.

MTC refers to a communication achieved between machines or between a machine and a server without human intervention, in which an involved machine is referred to as an MTC device and an involved server as an MTC server. MTC devices provide differentiated services from human involved communication services, and MTC may be applicable to a wide range of services.

In the future, the number of MTC devices is expected to increase dramatically. However, with a potential problem of network congestion caused by general communications between human users, a rapidly increasing number of MTC devices are expected to aggravate network congestion.

Meanwhile, various techniques have been discussed to control congestion by general communications between human users, but these conventional methods do not consider features of MTC devices. That is, the conventional congestion control techniques do not allow MTC devices to transmit even important data to promptly transmit or small data.

SUMMARY OF THE INVENTION

An aspect of the present invention is to provide a solution to the aforementioned problems.

In order to achieve the above object, in accordance with an aspect of the present invention, there is provided a method for transmitting data of a machine type communication (MTC) device. The method may comprise: receiving, by the MTC device and from a mobility management entity (MME) in a network, a mobility management (MM) back-off timer; operating the MM back-off timer; determining whether data to transmit is generated before the MM back-off timer expires; and transmitting the data through an uplink Non-Access Stratum (NAS) message even though the MM back-off timer does not expire when the data to transmit is generated.

The transmitting may include stopping the MM back-off timer even though the MM back-off timer does not expire.

The transmitting may comprise overriding the MM back-off timer even though the MM back-off timer does not expire.

The data to be transmitted is a monitoring data, a response to a trigger from the network, an SMS used to transmit small data, or location service (LCS) and protocol related data.

When the data to be transmitted is due to the trigger from the network, in the transmitting the MM back-off timer is stopped even though the MM back-off timer does not expire.

The uplink NAS message may comprise an SMS including the data to be transmitted.

The method may further comprise receiving a configuration for multi-level priority allowing operation in either of low priority and normal priority.

When the data to be transmitted is generated during operation in low priority according to the configuration for the multi-level priority, the method may comprise switching from the low priority to the normal priority.

The method may further comprise receiving a session management (SM) back-off timer from the MME; and operating the SM back-off timer.

In order to achieve the above object, in accordance with an aspect of the present invention, there is provided a machine type communication (MTC) device comprising: a reception unit to receive a mobility management (MM) back-off timer from a mobility management entity (MME) in a network; a processor to operate the MM back-off timer and to determine whether data to transmit is generated before the MM back-off timer expires; and a transmission unit to transmit the data to transmit through an uplink Non-Access Stratum (NAS) message even though the MM back-off timer does not expire when the data to transmit is generated.

ADVANTAGEOUS EFFECTS

According to the disclosure of the present specification, important data to promptly transmit or small data may effectively be transmitted in a Machine Type Communication (MTC) environment. Thus, a delay in MTC device services may be prevented and network resources may not be unnecessarily wasted.

DESCRIPTION OF EXEMPLARY EMBODIMENTS

Figure 1:
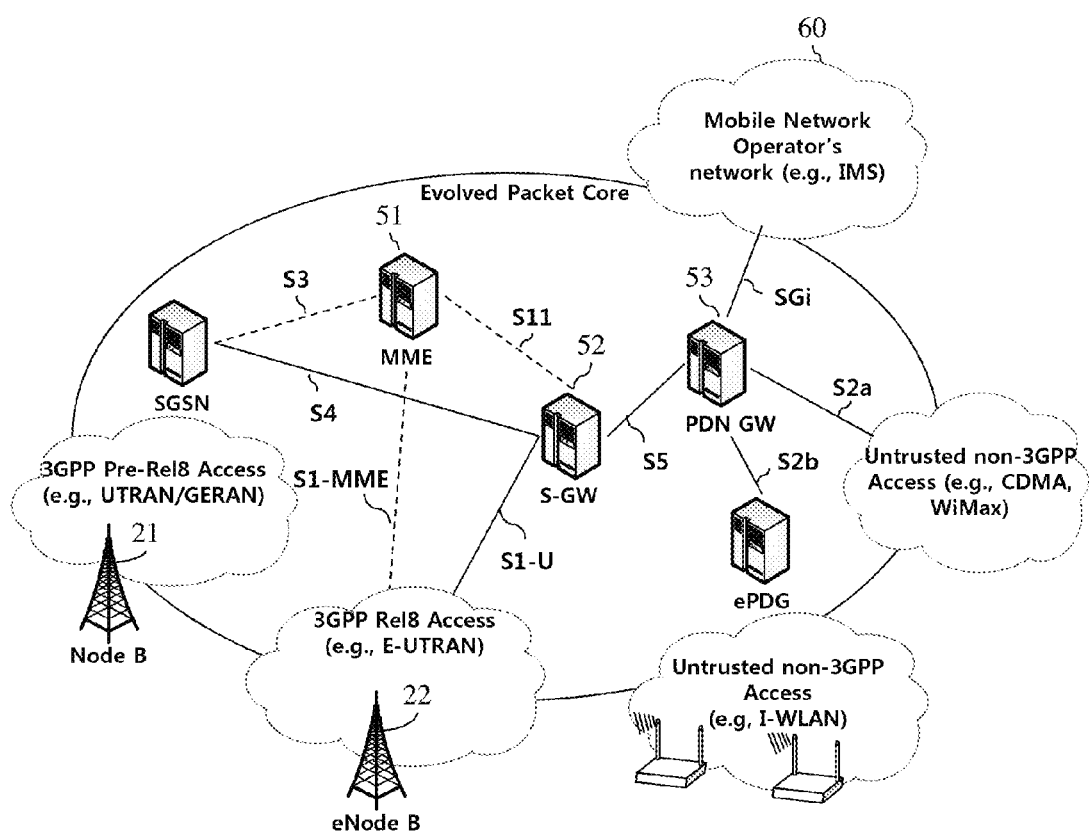
FIG. 1 shows the configuration of an evolved mobile communication network.
Figure 2:
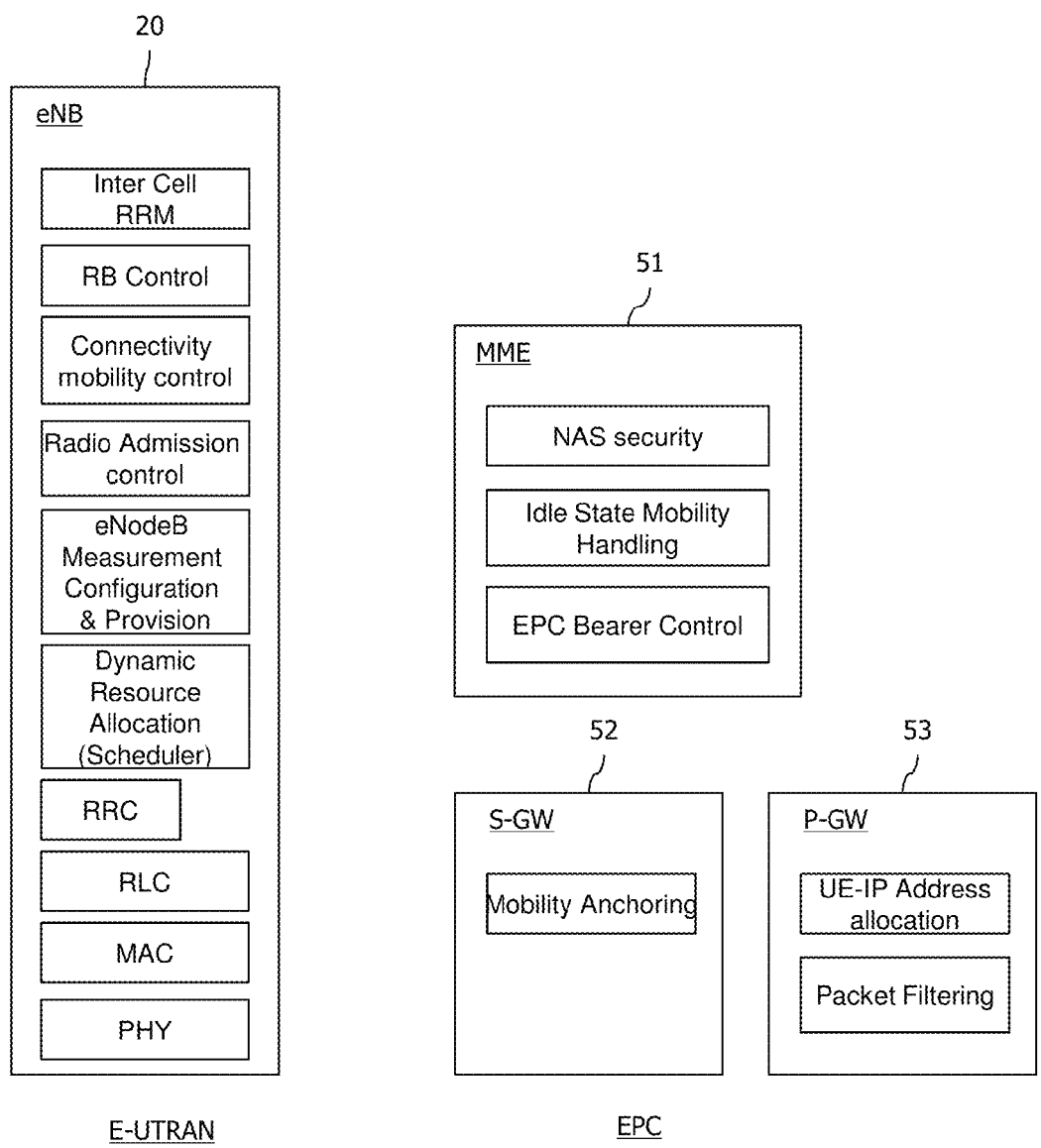
FIG. 2 is an exemplary diagram showing the architecture of a common E-UTRAN and a common EPC.
Figure 3A:
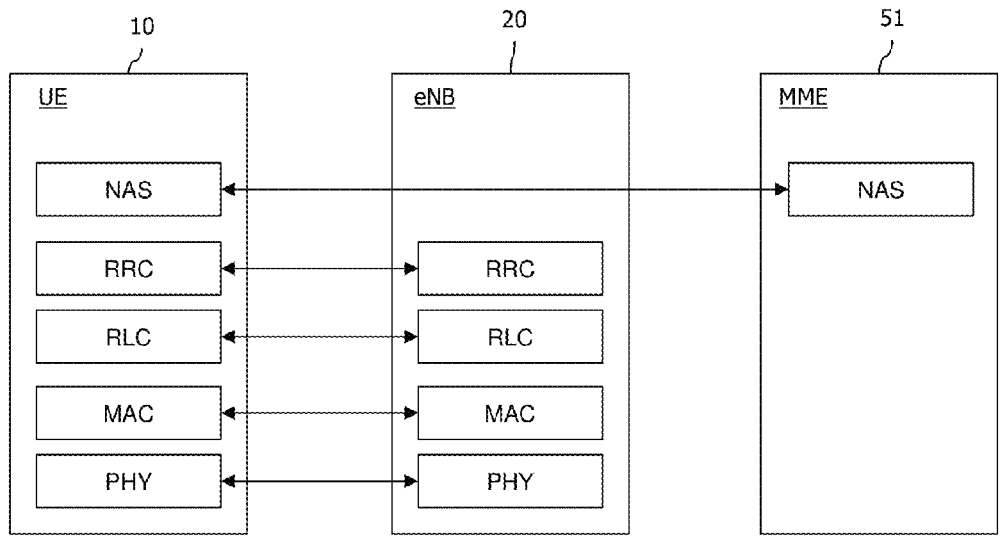
FIG. 3*a* is an exemplary diagram showing the structure of a radio interface protocol in a control plane between UE and an eNodeB.
Figure 3B:
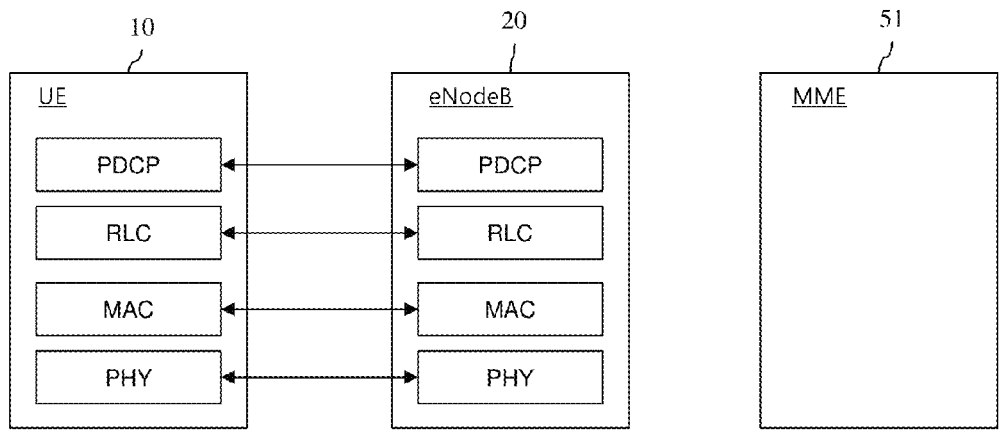
FIG. 3*b* is another exemplary diagram showing the structure of a radio interface protocol in a control plane between UE and an eNodeB.
Figure 4A:
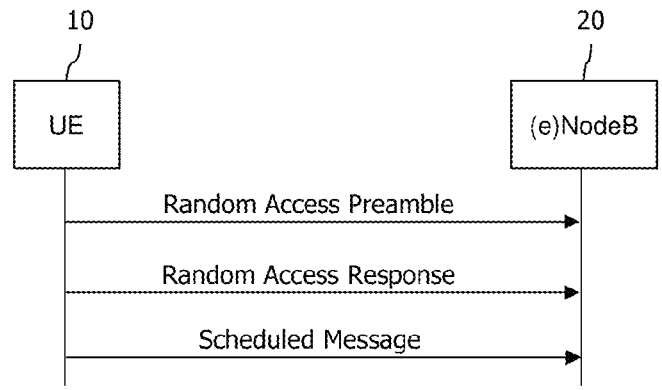
FIG. 4*a* is a flowchart illustrating a random access process in 3GPP LTE.
Figure 4B:
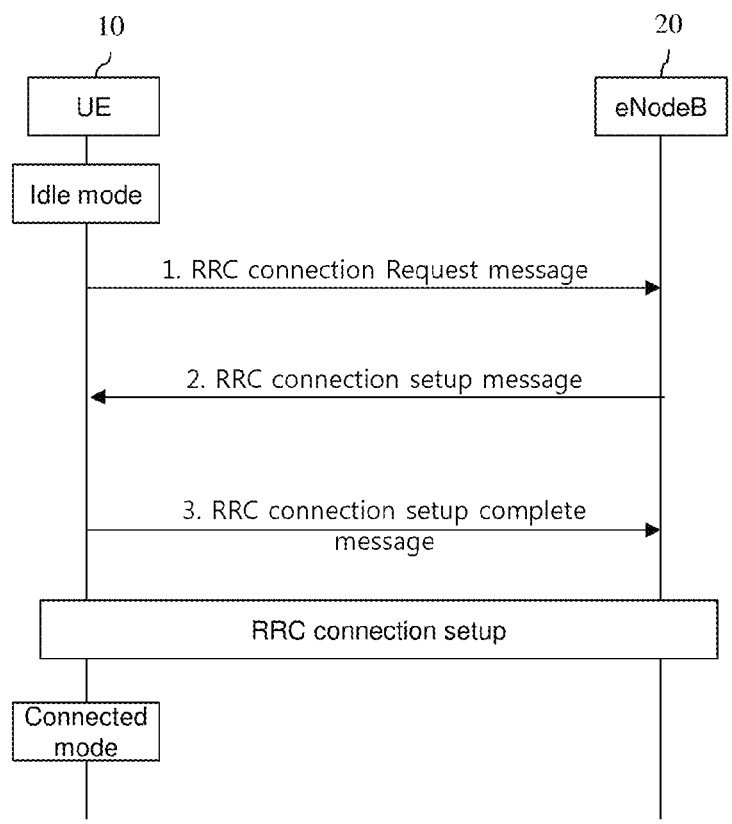
FIG. 4*b* illustrates a connection process in a radio resource control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term "include" or "have" may represent the existence of a feature, a number, a step, an operation, a component, a part or the combination thereof described in the specification, and may not exclude the existence or addition of another feature, another number, another step, another operation, another component, another part or the combination thereof.

The terms "first" and "second" are used for the purpose of explanation about various components, and the components are not limited to the terms "first" and "second." The terms "first" and "second" are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipment (UE) is shown for example. The UE may also be referred to as a terminal or mobile equipment (ME). The UE may be a laptop computer, a mobile phone, a PDA, a smartphone, a multimedia device or other portable devices, or may be a stationary device such as a PC or a car mounted device.

Definitions of Terms

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPS: stands for Evolved Packet System and means a mobile communication system including a UE, an access network including LTE, and an EPC.

PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameters associated with NAS functionality MTC: Machine Type Communication which is communication achieved between devices or between a device and a server without a human intervention.

MTC device: A UE which serves for a specific purpose having a communication function through a core network, for example, a vending machine, a meter reading device, a weather sensor, etc. The MTC device may be also referred to as an MTC terminal, an MTC apparatus, an MTC machine, an MTC UE, a UE user for MTC, a UE configured for MTC, etc.

MTC server: A server which manages the MTC device and exchanges data on a network. The server may exist outside the core network.

MTC application: An actual application using the MTC device and the MTC server (e.g., remote meter reading, product delivery tacking, etc.).

MTC feature: A function or feature of a network for supporting the application. That is, some features are required according to a usage of each application. Examples thereof include MTC monitoring (required for remote meter reading or the like for a lost device), a low mobility (almost no movement in case of the vending machine), small data transmission (only small amount of data is transmitted/received by the MTC device), etc.

MTC user: A user who uses a service provided by the MTC server.

NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority UE: A UE configured for NAS signalling low priority. The standard document 3GPP TS 24.301 and TS 24.008 may be incorporated by reference for details thereof.

Normal priority UE: A general UE not configured for low priority.

Dual priority UE: A UE configured for dual priority. That is, a UE which provides dual priority support is configured for a NAS signalling low priority and also configured to override the NAS signalling low priority indicator. The standard document 3GPP TS 24.301 and TS 24.008 may be incorporated by reference for details thereof.

Hereinafter, an aspect of the present specification is described with reference to the accompanying drawings.

Figure 5:
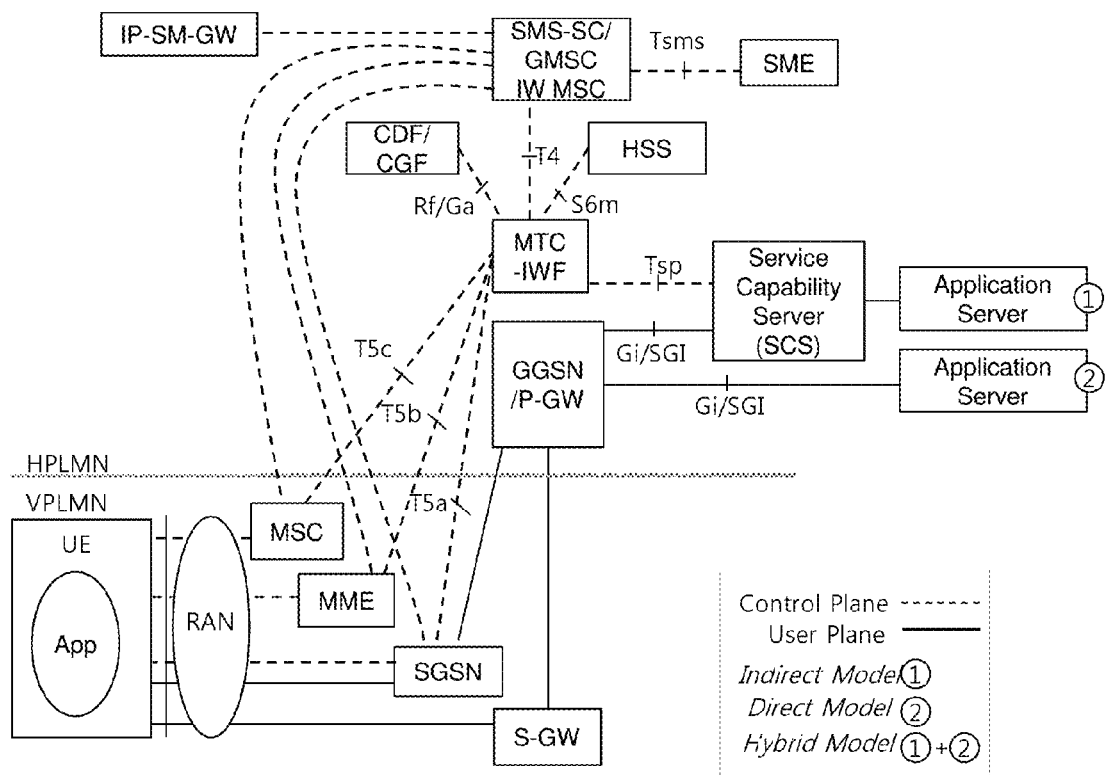
FIG. 5 shows a 3GPP service model for supporting MTC.

FIG. 5 shows a 3GPP service model for supporting MTC.

A Machine Type Communication (MTC) device may be used in a mobile communication system. MTC implies communication between one machine and another machine or between a machine and a server, excluding a human intervention. A device used in this case is called the MTC device, and a server used in this case is called an MTC server. A service provided through the MTC device is distinguished from a communication service based on the human intervention, and may be applied to various ranges of services.

The aforementioned MTC device is a communication device for performing communication between one machine and another machine or between a machine and a server, and is not much different from a User Equipment (UE) with a human intervention, except that the human intervention is excluded. That is, the MTC device may correspond to the UE excluding the human intervention. However, in terms of excluding the human intervention, some problems may occur if a message transmission/reception method (e.g., a paging message transmission/reception method) of the UE with the human intervention is collectively applied to the MTC device.

To support the MTC, although it is defined that communication is achieved through a PS network in GSM/UMTS/EPS of the 3GPP standard, a method applicable also to a CS network is described in the present specification.

Figure 7:
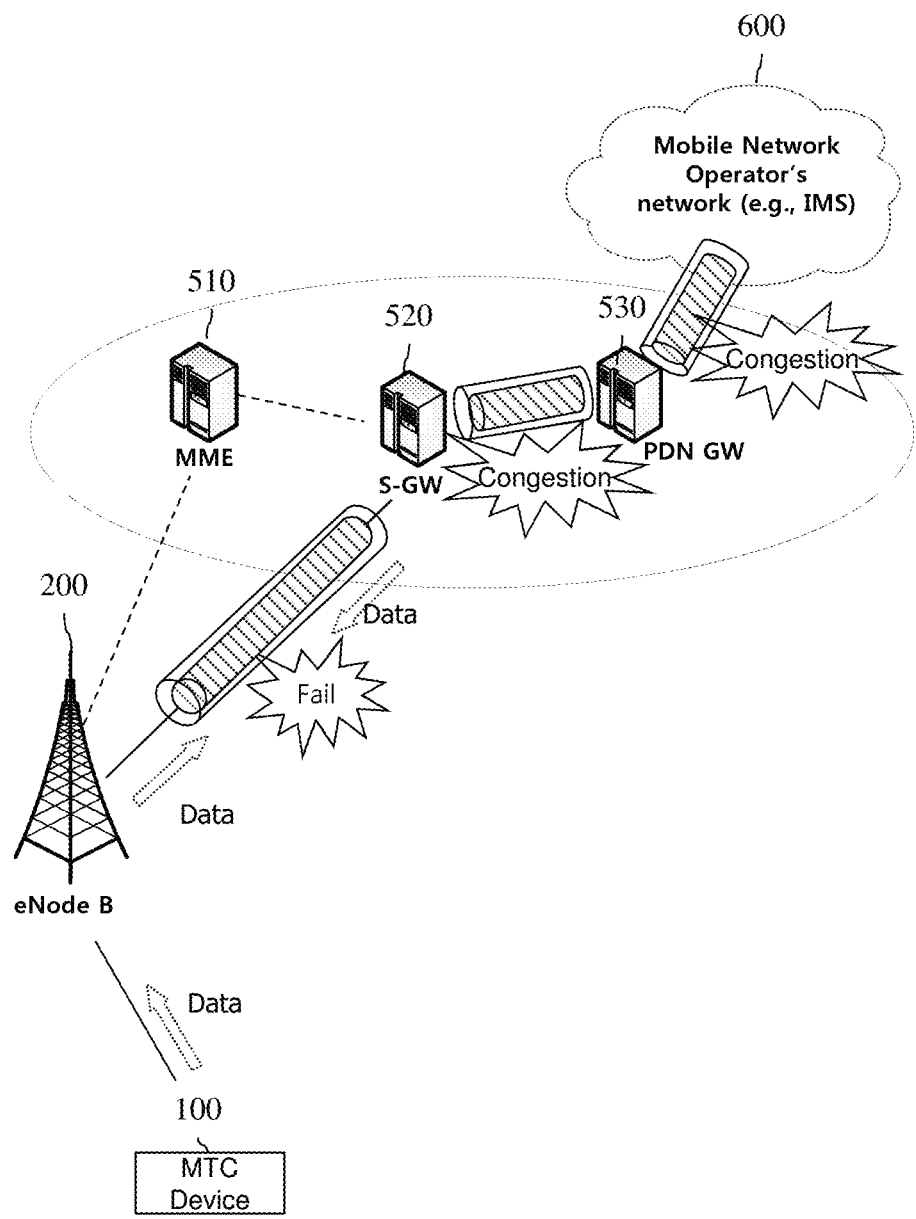
FIG. 7 illustrates network overload.

A UE used for the MTC (or an MTC UE) and an end-to-end application between MTC applications may use services provided by a 3GPP system and selective services provided by the MTC server. The 3GPP system may include transmission and communication services (including a 3GPP bearer service, an IMS, and an SMS) including various optimizations for facilitating the MTC. It is shown in FIG. 7 that the UE used for the MTC is connected to a 3GPP network (e.g., UTRAN, E-UTRAN, GERAN, I-WLAN, etc.) through an Um/Uu/LTE-Uu interface. The architecture of FIG. 7 includes various MTC models (e.g., a direct model, an indirect model, and a hybrid model).

Entities shown in FIG. 5 are now described.

In FIG. 5, an application server is a server on a network on which an MTC application is executed. The aforementioned various techniques for implementing the MTC applications may be applied to the MTC application server, and a detailed description thereof will be omitted. In addition, in FIG. 7, the MTC application server may access the MTC server through a reference point API, and a detailed description thereof will be omitted. Alternatively, the MTC application server may be collocated with the MTC server.

The MTC server (e.g., a Services Capability Server (SCS) shown in the figure) is a server on a network for managing an MTC UE, and may be connected to a 3GPP network to communicate with a UE used for MTC and nodes of PLMN.

An MTC-InterWorking Function (MTC-IWF) may control interworking between an MTC server and an operator core network, and may play a role of a proxy of an MTC action. To support the MTC indirect or hybrid model, one or more MTC-IWFs may exist in a Home PLMN (HPLMN). The MTC-IWF may relay or interpret a signaling protocol on a reference point Tsp to operate a specific function in the PLMN. The MTC-IWF may perform a function for authenticating an MTC server before the MTC server establishes communication with a 3GPP network, a function for authenticating a control plane request from the MTC server, various functions related to a trigger indication, etc.

An SMS-SC (Short Message Service-Service Center)/IP-SM-GW (Internet Protocol Short Message GateWay) may manage transmission/reception of a Short Message Service (SMS). The SMS-SC may relay a short message between a Short Message Entity (SME) (i.e., an entity for transmitting or receiving a short message) and a mobile station and may serve for a storing-and-delivering function. The IP-SM-GW may serve for a protocol interaction between an IP-based UE and the SMS-SC.

A CDF (Charging Data Function)/CGF (Charging Gateway Function) may perform an accounting related action.

An HLR/HSS may perform a function for storing subscriber information (e.g., IMSI, etc.), routing information, configuration information, etc., and for providing it to the MTC-IWF.

An MSC/SGSN/MME may perform a control function such as mobility management, authentication, resource allocation, etc., for network connection of the UE. Regarding triggering, a function for receiving a trigger indication from the MTC-IWF and for processing it in a form of a message provided to the MTC UE may be performed.

A GGSN (Gateway GPRS Support Node)/S-GW (Serving-Gateway)+P-GW (Packet Data Network-Gateway) may perform a function of a gateway which serves for connection of a core network and an external network.

Table 2 below is a summary of an important reference point in FIG. 7.

TABLE 2

| Reference point | Description |
| --- | --- |
| Tsms | It is the reference point used by an entity outside the 3GPP system to communicate with UEs used for MTC through an SMS. |
| Tsp | It is the reference point used by an entity outside the 3GPP system to communicate with the MTC-IWF related control plane signalling. |
| T4 | A reference point used by the MTC-IWF to route device trigger to the SMS-SC in the HPLMN. |
| T5a | A reference point used between the MTC-IWF and the serving SGSN. |
| T5b | A reference point used between the MTC-IWF and the serving MME. |
| T5c | A reference point used between the MTC-IWF and the serving MSC. |
| S6m | A reference point used by the MTC-IWF to interrrogate the HSS/HLR for E.164 MSISDN(Mobile Station International Subscriber Directory Number) or external identifier mapping to IMSI and gather UE reachability and configuration information. |

At least one of the reference points T5a, T5b, and T5c is referred to as T5.

Meanwhile, user plane communication with the MTC server in case of the indirect and hybrid model and communication with the MTC application in case of the direct and hybrid model may be performed by using the existing protocol through reference points Gi and SGi.

The 3GPP TS 23.682 document may be incorporated by reference for details of the description of FIG. 5.

Figure 6:
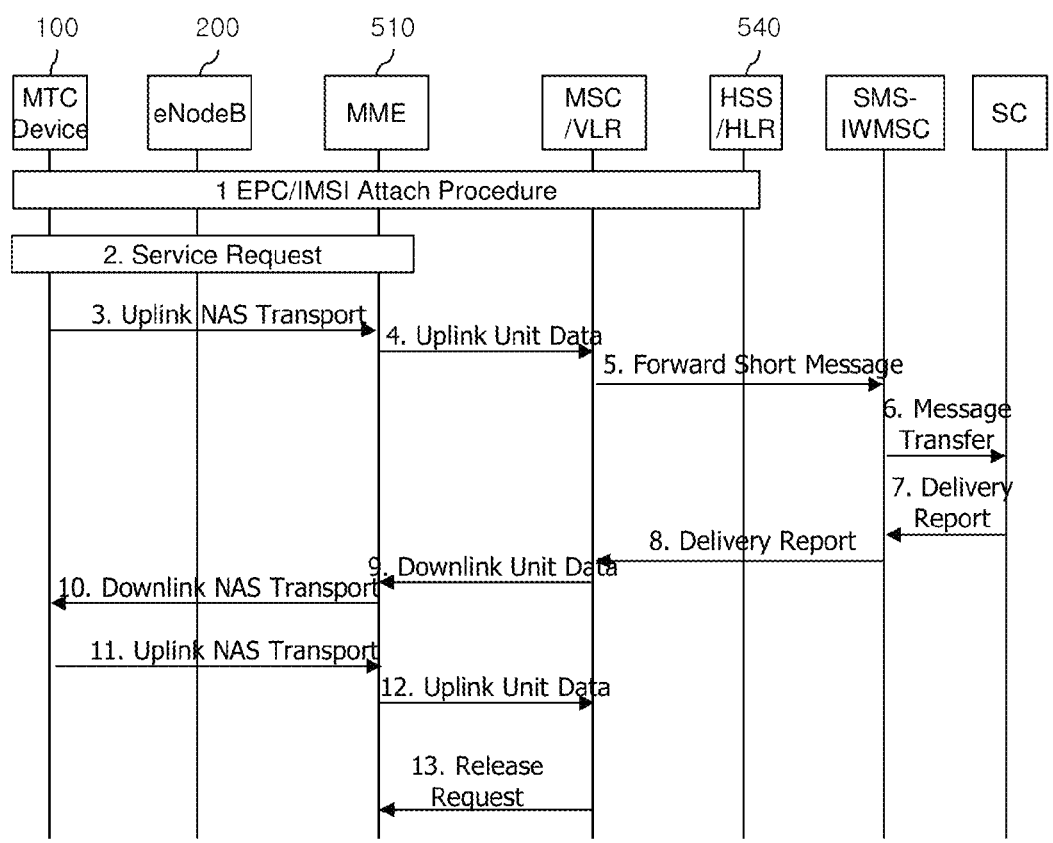
FIG. 6 illustrates signal flow when an MTC device transmits data through an SMS.

FIG. 6 illustrates signal flow when an MTC device transmits data through an SMS.

The MTC device 100 may use the SMS to transmit small data depending on operations. The MTC device 100 may also use an SMS to transmit a response to a trigger from a network.

Use of the SMS may reduce network loads because the SMS does not pass through an S-GW and a P-GW. The signal flow is described in detail as follows with reference to the drawing.

1) The MTC device 100 performs an EPC/IMSI Attach procedure.

2) Subsequently, the MTC device 100 makes a Service Request.

3) The MTC device 100 transmits the SMS to an MME 510 via an Uplink NAS Transport message.

4)-6) The MME 510 transmits the SMS to a Mobile Switching Center (MSC)/VLR via Uplink Unit Data. The MSC/VLR transmits the SMS to an SMS-IWMSC via a Forward Short Message, and the SMS-IWMSC delivers the SMS to the SC.

8)-9) The SC delivers a Delivery Report to the MSC/VLR via the SMS-IWMSC. The MSC/VLR transmits Downlink Unit Data to the MME.

10) The MME 510 delivers a Downlink NSA Transport message to the MTC device 100. Accordingly, the MTC device 100 may verify whether the SMS is successfully delivered.

11)-13) Subsequently, the MTC device 100 delivers the Uplink NAS Transport message back to the MME 510, and the MME 510 delivers the Uplink Unit Data to the MSC/VLR. The MSC/VLR delivers a Cancellation Request message to the MME 510.

For reference, when the MME 510 has an SMS delivery function, the MME 510 may deliver the SMS directly to the SMS-IWMSC, not via the MSC/VLR.

FIG. 7 illustrates network overload.

As illustrated in FIG. 7, when traffic overload or congestion occurs in an interface between an eNodeB 200 and an S-GW 520, downlink data to an MTC device 100 or uplink data from the MTC device 100 is not successfully transmitted.

Alternatively, when an interface between the S-GW 520 and a PDN-GW 530 or an interface between the PND-GW 530 and an Internet Protocol (IP) service network of a mobile service provider is overloaded or congested, the downlink data to the MTC device 100 or uplink data from the MTC device 100 is also not successfully transmitted.

Methods for controlling network overload or congestion including the aforementioned overload or congestion will be described below.

Congestion Control

When network congestion occurs in a 3GPP network, a node (MME and SGSN) of a core network performs NAS level congestion control to avoid or control signaling congestion and APN congestion.

The NAS level congestion control includes APN based congestion control and general NAS level mobility management control.

The APN based congestion control refers to EMM, GMM and (E)SM signaling congestion control related to a UE (that is, MTC device) and a particular APN (APN associated with congestion), which includes APN based Session Management congestion control and APN based Mobility Management congestion control.

The general NAS level mobility management control means that the node (MME and SGSN) of the core network rejects a Mobility Management signaling request made by a UE/MS in general network congestion or overload to avoid congestion and overload.

Generally, when the core network performs NAS level congestion control, the core network transmits a back-off timer value via an NAS Reject message to a UE in idle mode or connected mode, and the UE does not request an EMM/GMM/(E)SM signal from the network until the back-off timer expires. The NAS Reject message corresponds to one of ATTACH REJECT, Tracking Area Updating (TAU)/Routing Area Updating (RAU) Reject, Service Reject, EXTENDED SERVICE Reject, PDN Connectivity Reject, bearer resource allocation reject, bearer resource modification reject, and deactivate EPS bearer context request reject messages.

The back-off timer may include an MM back-off timer and an SM back-off timer.

The MM back-off timer operates by UE, and the SM back-off timer operates independently by APN and UE.

In short, the MM back-off timer is for controlling EMM/GMM signaling (for example, Attach and TAU/RAU requests). The SM back-off timer is for controlling (E)SM signaling (for example, PDN connectivity, Bearer Resource Allocation, Bearer Modification, PDP Context Activation and PDP Context Modification requests).

In detail, the MM back-off timer is a back-off timer relating to mobility used to control network congestion, which does not allow the UE to conduct an Attach request, TAU and RAU requests, and a service request procedure while the timer is operating. Exceptionally, the UE may be allowed to request an emergency bearer service and a Multimedia Priority Service (MPS) while the time is operating.

As described above, the UE may receive an MM back-off timer value from the network node (for example, MME, SGSN, or the like) of the core network or from a lower layer (Access Stratum). Alternatively, the UE may set a random MM back-off timer value in a range of 15 minutes to 30 minutes.

Meanwhile, the SM back-off timer is a back-off timer relating to SM used to control network congestion, which does not allow the UE to set up or modify an associated APN based session while the timer is operating. Exceptionally, the UE (device) may also be allowed to request an emergency bearer service and a Multimedia Priority Service (MPS) while the time is operating.

The UE may receive an SM back-off timer value from the network node (for example, MME, SGSN, or the like) of the core network, which is randomly set within up to 72 hours. Alternatively, the UE may set a random MM back-off timer value in a range of 15 minutes to 30 minutes.

The (e)NodeB may also perform congestion control. In congestion in a Radio Access Network (RAN) or key network, the UE may receive a Reject response from the (e)NodeB along with an extended wait timer when performing an RRC/RR(C) connection establishment procedure. In this case, the UE is not allowed to initiate the EMM/GMM procedure until the extended wait timer received from the (e)NodeB expires (thus, the UE is not allowed to initiate the RRC/RR(C) connection establishment procedure). The UE uses the extended wait timer an MM back-off timer.

Figure 8A:
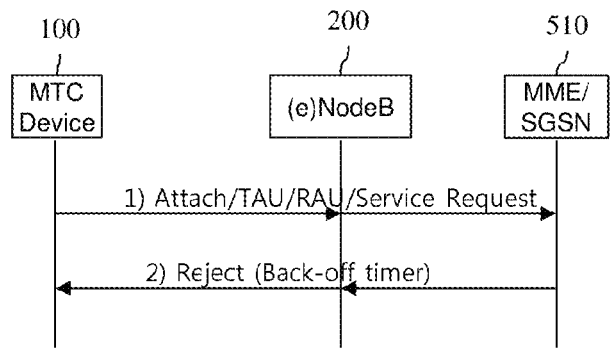
FIGS. 8*a*, 8*b* and 8*c* illustrate a procedure of rejecting an MM operation or SM operation or RRC connection of an MTC device in network congestion or overload
Figure 8B:
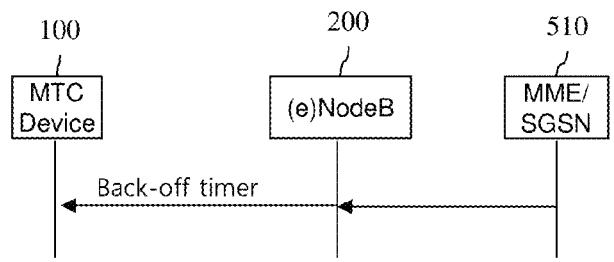

FIGS. 8a and 8b illustrate a procedure of rejecting an MM operation or SM operation of an MTC device in network congestion or overload.

Referring to FIG. 8a, when the MTC 100 performs a procedure for an Attach request, a TAU request, an RAU request, or a service request through an (e)NodeB 200 in network congestion or overload, a node, for example, MME/SGSN 510, in the network transmits a Reject message with respect to the Attach request, TAU request, RAU request, or service request in accordance with a network condition, such as an operator policy.

The MME/SGSN 510 include a back-off timer in the Reject message when transmitting the Reject message, so that the MTC device 100 may not reattempt connection until the back-off timer expires.

Alternatively, as illustrated in FIG. 8b, in network congestion or overload, the network node, for example, MME/SGSN 510, may transmit the back-off timer to the MTC device 100 through the (e)NodeB 200 in accordance with a network condition, such as an operator policy. The back-off timer may include a message (for example, Deactivate EPS Bearer Context request and Deactivate PDP context request) transmitted by the MME/SGSN 510 to the MTC device 100 at transmission.

Meanwhile, when the Reject message is a TAU Reject message, data listed in Table 3 may be included.

TABLE 3

| Data | Description |
| --- | --- |
| Protocol discriminator | Discriminator to distinguish protocol |
| Security header type | Type of header used for security |
| TAU Reject message ID | Identifier of message |
| Reason for EMM | Indicates reason for rejection |
| T3346 value | Back-off timer (MM back-off timer) |

Meanwhile, when the message is a Deactivate EPS Bearer Context request message, data listed in Table 4 may be included.

TABLE 4

| Data | Description |
| --- | --- |
| Protocol discriminator | Discriminator to distinguish protocol |
| EPS bearer ID | Identifier of EPS bearer |
| Procedure transaction ID | Identifier of procedure transaction |
| Deactivate EPS bearer context request message ID | Identifier of message |
| Reason for ESM | Indicates reason for rejection |
| Protocol configuration options | Protocol related information |
| T3396 value | Back-off timer (SM back-off timer) |

Meanwhile, the eNodeB 200 may also perform congestion control. For example, the eNodeB 200 may operate as in FIG. 8c with respect to an RRC connection request, thereby performing congestion control.

Figure 8C:
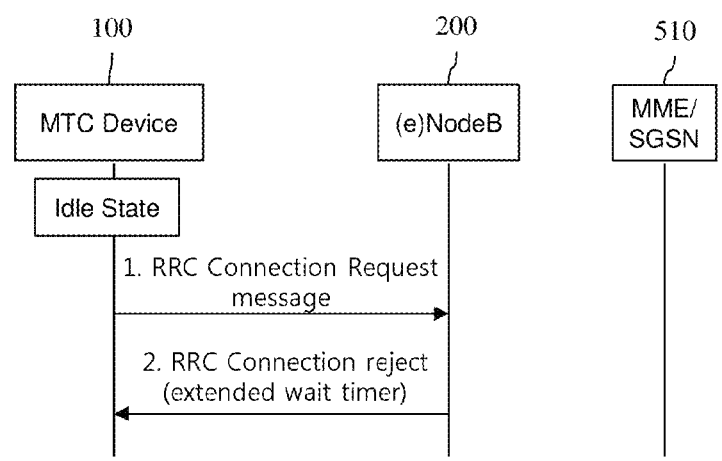

FIG. 8c illustrates rejection of RRC connection.

Referring to FIG. 8c, the MTC device 100 in an idle state transmits an RRC connection request message to the eNodeB 200 to conduct an RRC connection for data transmission.

Here, when the eNodeB 200 is overloaded, the eNodeB 200 transmits an RRC Connection Reject message to the MTC device 100. The RRC Connection Reject message may include an extended wait timer. The extended wait timer is a wait time in seconds for a Delay Tolerant access request. The extended wait timer may be set to up to 1800 seconds (that is, 30 minutes).

Figure 9A:
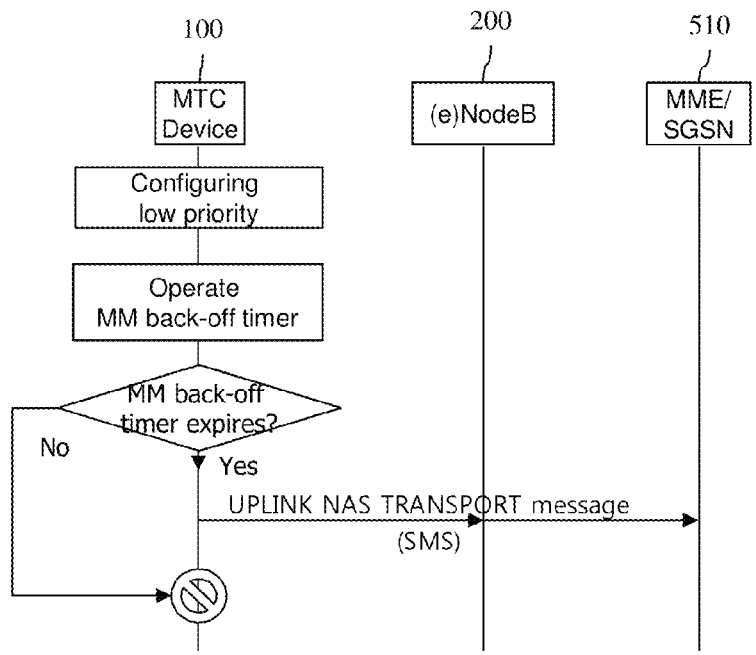
FIGS. 9*a* and 9*b* illustrate problems resulting from NAS signaling priorities of an MTC device and operation of a back-off timer in the MTC device.
Figure 9B:
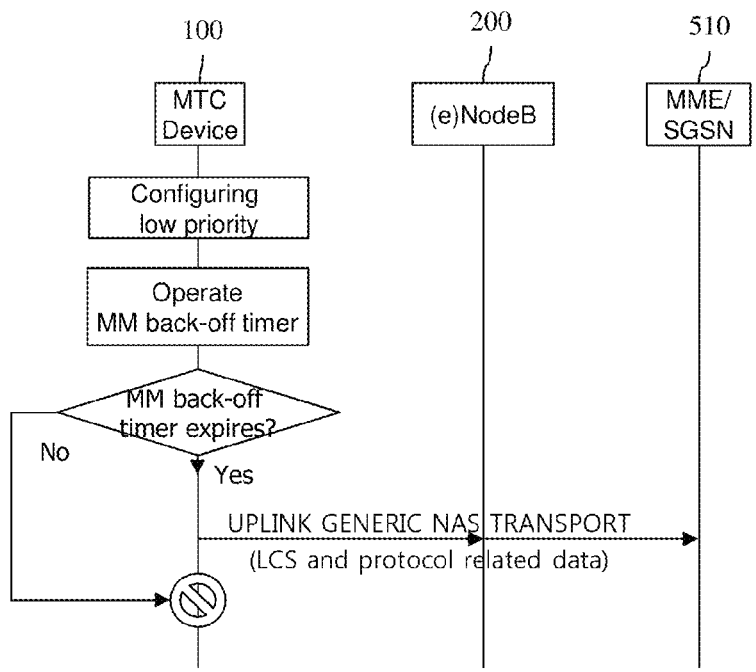

FIGS. 9a and 9b illustrate problems resulting from NAS signaling priorities of an MTC device and operation of a back-off timer in the MTC device.

As shown in FIGS. 9a and 9b, the MTC device 100 may frequently be configured for low priority operation, in which case the MTC device 100 is highly likely to receive an MM back-off timer in network congestion.

While at least one of the MM back-off timer and an SM back-off timer is operating in the low priority MTC device 100, the MTC device 100 is not allowed to request any MM or SM signaling from the network.

Thus, as shown in FIG. 9a, the MTC device 100 is not allowed to transmit an Uplink NAS transport message including an SMS until the MM back-off timer expires.

Meanwhile, the MTC device 100 may need to periodically transmit uplink data relating to a location service, that is, Location Service (LCS) and protocol related data, for example, when the MTC device 100 leaves a particular location or enters a particular area.

However, as shown in FIG. 9b, the MTC device 100 is not allowed to transmit an Uplink Generic NAS transport message including the LCS and protocol related data until the MM back-off timer expires.

Ultimately, the current 3GPP standard does not suggest any method for efficiently managing transmission of the SMS and the LCS and protocol related data and operation of the MM back-off timer by the MTC device 100 in network congestion, thus causing confusion. This problem further deteriorates a network condition, service connectivity, and user experience.

Figure 10:
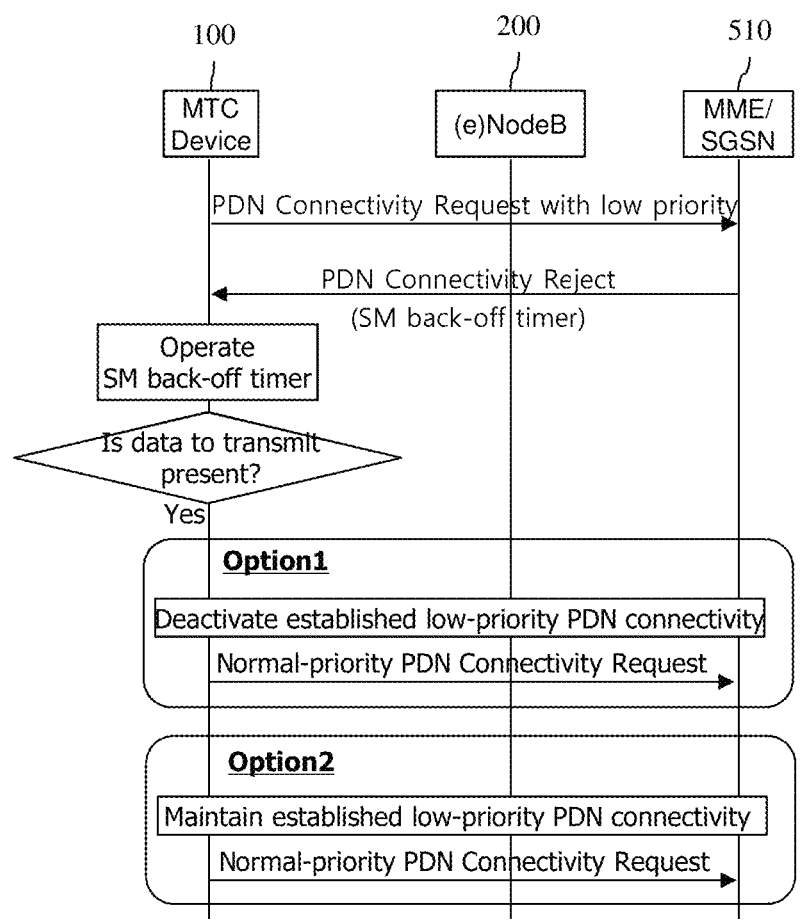
FIG. 10 shows another problem resulting from operation of a back-off timer by an MTC device.

FIG. 10 shows another problem resulting from operation of a back-off timer by the MTC device.

The MTC device 100 may be set to dual priority, in which the MTC device 100 operates in either of low priority and normal priority.

When the MTC device 100 makes a PDN connectivity request for data transmission during operation in low priority as shown in FIG. 10, the MTC device 100 is highly likely to receive an SM back-off timer along with a PDN Connectivity Reject message.

Meanwhile, when the MTC device 100 has important data to promptly transmit, the MTC device 100 may need to switch from the low priority to normal priority or non-low priority. However, the MTC device 100 is already operating according to the received SM back-off timer and thus has no way to promptly transmit the important data.

To allow transmission of the important data, the MTC device 100 deactivates the low-priority PDN connectivity request, which has been made but rejected, and makes a new PDN connectivity request based on the normal priority or non-low priority.

Alternatively, the MTC device 100 makes a new PDN connectivity request based on the normal priority or non-low priority, overriding the low-priority PDN connectivity request, which has been made but rejected.

Figure 11:
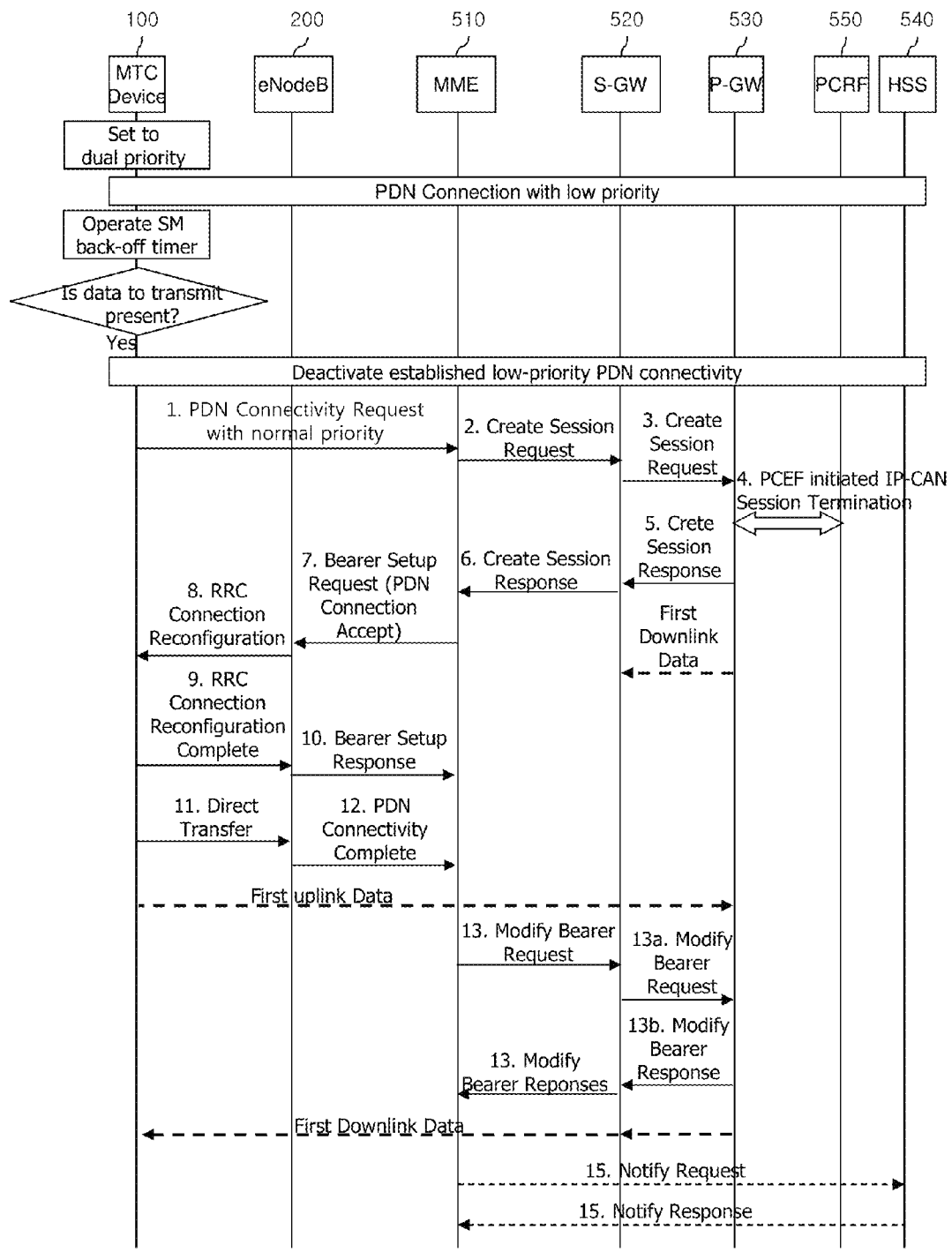
FIG. 11 illustrates the problem described in FIG. 10 in detail.

FIG. 11 illustrates the problem described in FIG. 10 in detail.

As described above, the MTC device 100 may be set to dual priority, in which the MTC device 100 operates in either of low priority and normal priority.

Suppose that the MTC device 100 makes a PDN connectivity request for data transmission during operation in low priority as shown in FIG. 11.

Then, the MTC device 100 receives an SM back-off timer and operates accordingly.

Here, when the MTC device 100 has important data to promptly transmit, the MTC device 100 may need to switch from the low priority to normal priority or non-low priority to transmit the data. However, even though the MTC device 100 switches from the low priority to the normal priority or non-low priority, the MTC device 100 is already operating according to the received SM back-off timer and thus has no way to promptly transmit the important data.

To allow transmission of the important data, the MTC device 100 may need to deactivate the low-priority PDN connectivity request, which has been made but rejected, and make a new PDN connectivity request based on the normal priority or non-low priority.

Accordingly, the MTC device 100 first deactivates the low-priority PDN connectivity request.

Subsequently, the MTC device 100 transmits a new PDN connectivity request to an MME 510 based on the normal priority.

The MME 510 transmits a Create Session Request message to a P-GW 530 via an S-GW 520 to create PDN connectivity. The P-GW 530 performs a PCRF 550 and a PCEF initiated IP-CAN Session Termination procedure as necessary.

The P-GW 530 transmits a Create Session Response message to the MME 510 via the S-GW 520. Accordingly, the P-GW 530 is ready to transmit first downlink data.

The MME 510 transmits a Bearer Setup Request message including a PDN Connection Accept message to the eNodeB 200.

The eNodeB 200 transmits an RRC Connection Reconfiguration message to the MTC device 100 to set up RRC connection with the MTC device 100.

The MTC device 100 transmits an RRC Connection Reconfiguration Complete message to the eNode B 200, and the eNodeB 200 transmits a Bearer Setup Response message to the MME 510.

Meanwhile, the MTC device 100 transmits a Direct Transfer message including a PDN Connectivity Complete message to the eNodeB 200, and the eNodeB 200 transmits the PDN Connectivity Complete message to the MME 510. Accordingly, the MTC device 100 transmits the first uplink data up to the P-GW 530.

Meanwhile, the MME 510 transmits a Modify Bearer Request message to the P-GW 530 via the S-GW 520.

The P-GW 530 transmits a Modify Bearer Response message to the MME 510 via the S-GW 520.

Accordingly, the P-GW 530 may transmit the first downlink data to the MTC device 100.

Meanwhile, the MME 510 transmits a Notify Request message and receives a Notify Response message to transmit information to the HSS 540.

As described above, even though the MTC device 100 has important data to promptly transmit and thus switches from the low priority to the normal priority or non-low priority, the MTC device 100 is already operating according to the received SM back-off timer. Thus, the MTC device 100 needs to request new PDN connectivity, with the established PDN connectivity deactivated or maintained, in order to promptly transmit the important data. However, as shown in FIG. 11, transmitting and receiving a plurality of signals are needed to establish new PDN connectivity, thus requiring considerable amount of time.

Figure 12:
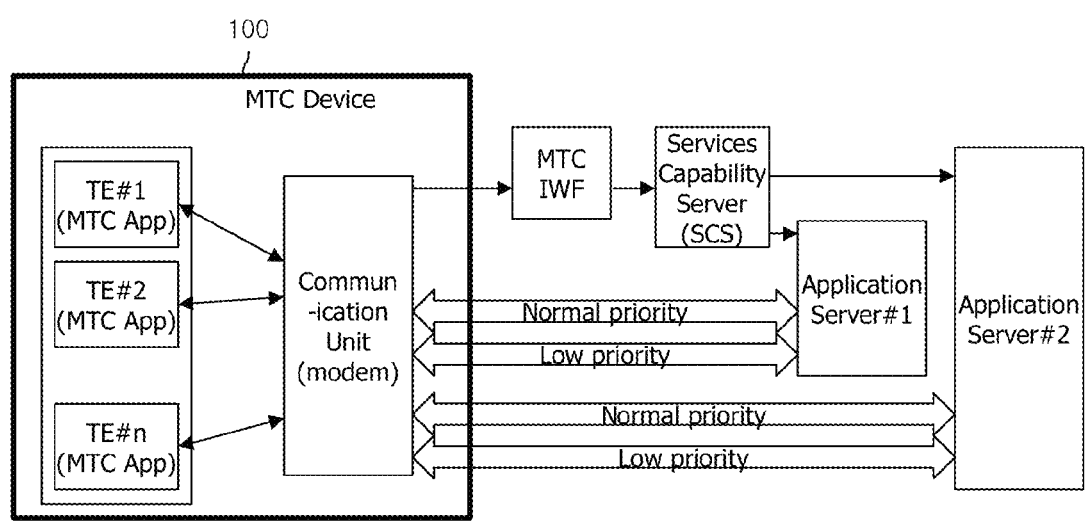
FIG. 12 shows an up-to-date MTC device involving the problem illustrated in FIG. 10.

FIG. 12 shows an up-to-date MTC device involving the problem illustrated in FIG. 10.

As illustrated in FIG. 12, there are attempts to connect a plurality of terminal equipments (TEs) to a single MTC 100 or to integrate the TEs with the MTC device 100. For example, a plurality of temperature sensing devices are installed in a building and connected to a single MTC device 100. Alternatively, an air pollution detector, a fire detector, a dangerous object detector, or the like are integrated with a single MTC device such as a vending machine. Accordingly, the TEs share a single communication unit (modem) in the MTC device 100.

The TEs connected to or integrated with the MTC device 100 share PDN connection to the same APN. Here, each TE requests data transmission from the communication unit of the MTC device 100 based on an operation/decision of own application thereof (in low priority or normal priority), and thus the communication unit of the MTC device 100 needs to transmit data using PDN connection in appropriate priority according to the request.

Data transmission is simplified if an operator/network supports multiple PDN connections to the single APN, which are less likely to be allowed.

Thus, the communication unit of the MTC device 100 forces low priority PDN connection to be deactivated or waits until the low priority PDN connection is deactivated and then establishes new PDN connection based on normal priority in order to transmit data, during which data transmission is inevitably delayed.

Accordingly, there is urgently needed a novel method for the MTC device 100 to handle an MM back-off timer currently operating when there is data to transmit.

In addition, there is also required a solution to the foregoing problem of not allowing transmission of even small data, such as monitoring data, a response to a trigger from a network and an SMS used to transmit small data, while the MM back-off timer is operating. Furthermore, there is required a solution to the foregoing problem of not allowing transmission of even small data which is essential, such as LCS and protocol related data, while the MM back-off timer is operating.

Therefore, solutions to the aforementioned problems are suggested hereinafter.

<Solutions Suggested in the Present Specification>

According to one embodiment of the present specification, when there is data to promptly transmit, the MTC device 100 may immediately transmit a PDN Connectivity Request message using an SMS without transmitting to a network.

In detail, according to the embodiment of the present specification, when there is an SMS or LCS and related data to promptly transmit, the MTC device 100 may override or stop an MM back-off timer and an extended wait timer, which are operating, and then transmit the PDN Connectivity Request message through an Uplink NAS Transport message or Uplink Generic NAS Transport message.

Particularly, according to the embodiment of the present specification, the MTC device 100 may immediately transmit the SMS via the Uplink NAS Transport message, regardless of presence of previous PDN connectivity established with low priority. That is, even when the previous PDN connectivity is established with low priority, the MTC device 100 may transmit the SMS via the Uplink NAS Transport message without deactivating the previous PDN connectivity or conducting an operation of establishing another PDN connectivity with the previous PDN connectivity maintained. Here, when the MM back-off timer and the extended wait timer are operating, the MTC device 100 overrides or stops the MM back-off timer and the extended wait timer.

Meanwhile, an SMS message including a prompt response to a trigger from the network and small data may explicitly or implicitly include indicators or information representing the response to the trigger from the network and the small data.

The indicator or information may be included not in the SMS message but in either of a separate NAS MM message (for example, Attach Request message, TAU Request message, RAU Request message and Service Request message) and RRC Connection Request message.

Meanwhile, the RRC Connection Request message is transmitted in order to transmit the Uplink NAS Transport message or Uplink Generic NAS Transport message, the RRC message may or may not include (or set up) low priority information (or delayTolerantAccess related information).

Here, when Extended Access Barring (EAB) is applied, it may be indicated not to apply EAB (or information to conduct EAB application may not included) when RRC connection from an NAS level to an RRC level is requested.

Concepts of the forgoing additional operations may also be applied to Access Class Barring (ACB), Extended Access Baring (EAB), or the like in an extended manner. For instance, even when ACB is applied to the MTC device 100, the MTC device 100 is capable of transmitting the report message without being subjected to ACB.

Figure 13A:
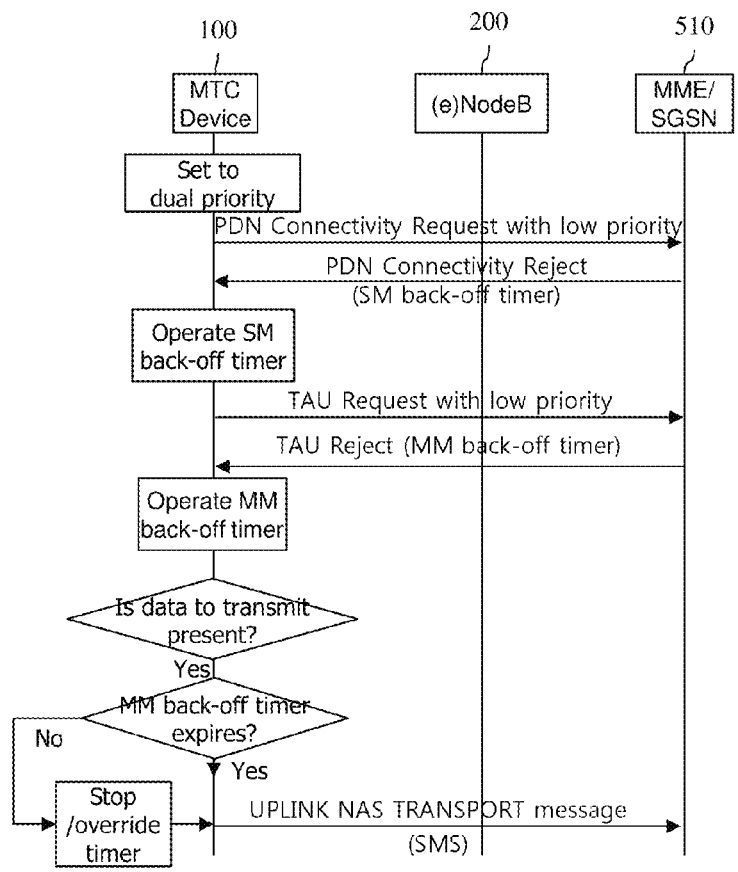
FIGS. 13*a* and 13*b* are flowcharts illustrating a second embodiment suggested in this specification.
Figure 13B:
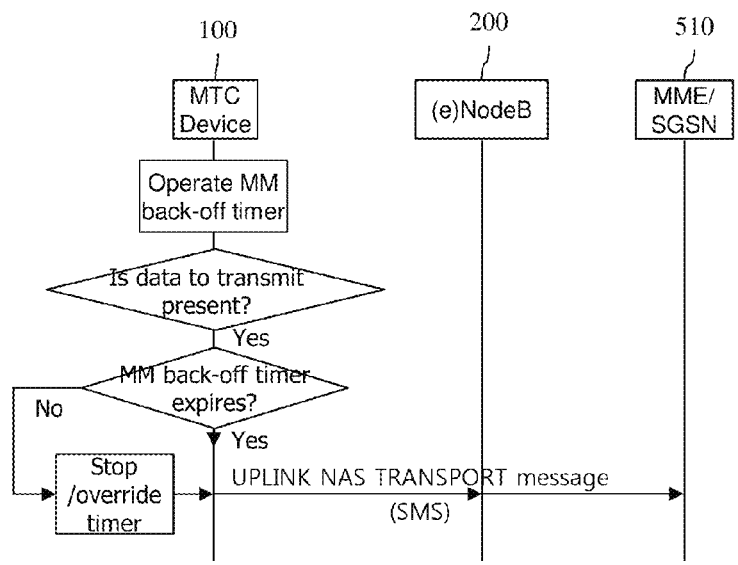

FIGS. 13a and 13b are flowcharts illustrating a first embodiment suggested in this specification.

As shown in FIG. 13a, according to the first embodiment, when there is small data to transmit, such as monitoring data, a response to a trigger from a network and an SMS used to transmit small data, in a state that the MTC device 100 is set to multi-level priority and an SM back-off timer and an MM back-off timer are operating, the MTC device 100 is allowed to transmit the small data through an Uplink NAS Transport message encapsulated in a Short Message even before the MM back-off timer expires.

Here, the MTC device 100 may switch from low priority to normal priority. Thus, according to the first embodiment, the Uplink NAS Transport message may also include an indication representing the normal priority or non-low priority Meanwhile, as shown in FIG. 13b, when the MTC device 100 is not set to the low priority, the SM back-off timer is not operating, and only the MM back-off timer is operating, the MTC device 100 is allowed to transmit the small data through the Uplink NAS Transport message encapsulated in the Short Message even before the MM back-off timer expires.

Particularly, the small data has no substantial effect on network congestion, and thus the MTC device 100 may override the MM back-off timer even before the MM back-off timer expires.

Alternatively, when the small data is transmitted as the response to the trigger from the network, the MTC device 100 may implicitly understand that the network congestion is resolved. Thus, in this case, the MTC device 100 may stop the MM back-off timer.

Meanwhile, according to the first embodiment, the Uplink NAS Transport message may include an indication to indicate that the small data needs promptly transmitting or an indication to indicate that the small data is the response to the network trigger.

Accordingly, the present embodiment may solve conventional inconveniences of not allowing transmission of small data or requiring a procedure of deactivating established PDN connectivity and establishing new PDN connectivity for transmission of small data while the MM/SM back-off timers are operating.

Figure 14A:
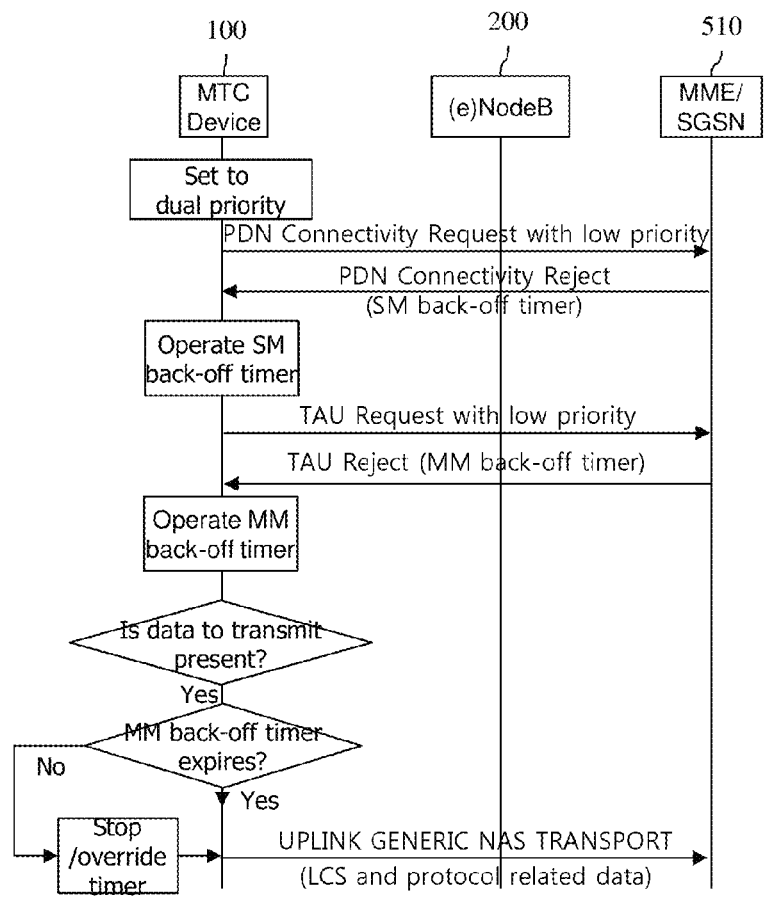
FIGS. 14*a* and 14*b* are flowcharts illustrating a second embodiment suggested in this specification.
Figure 14B:
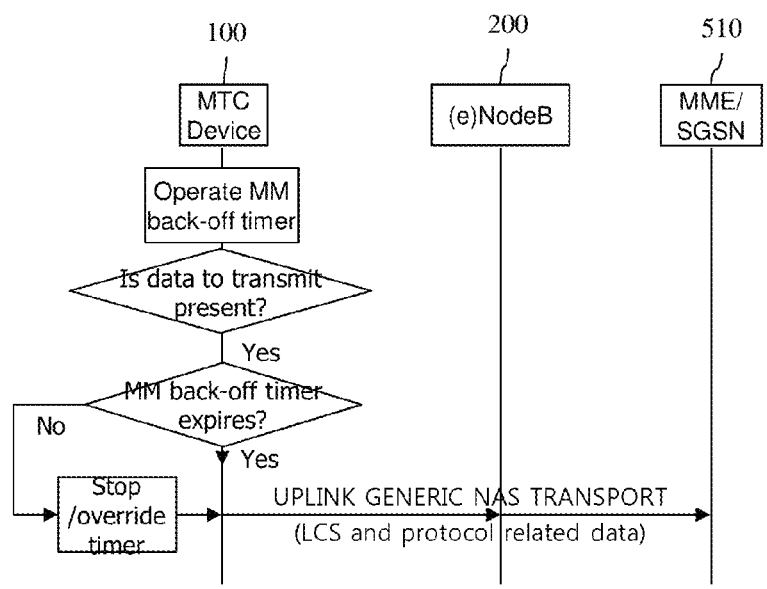

FIGS. 14a and 14b are flowcharts illustrating a second embodiment suggested in this specification.

As shown in FIG. 14a, according to the second embodiment, when there is LCS and protocol related data to transmit in a state that the MTC device 100 is set to multi-level priority and an SM back-off timer and an MM back-off timer are operating, the MTC device 100 is allowed to transmit the LCS and protocol related data through an Uplink NAS Generic Transport message even before the MM back-off timer expires.

Here, the MTC device 100 may switch from low priority to normal priority. Thus, according to the second embodiment, the Uplink NAS Generic Transport message may also include an indication representing the normal priority or non-low priority Meanwhile, as shown in FIG. 14b, when the MTC device 100 is not set to the low priority, the SM back-off timer is not operating, and only the MM back-off timer is operating, the MTC device 100 is allowed to transmit the LCS and protocol related data through an Uplink NAS Generic Transport message even before the MM back-off timer expires.

Particularly, the LCS and protocol related data is small and thus has no substantial effect on network congestion, and accordingly the MTC device 100 may override the MM back-off timer even before the MM back-off timer expires.

Alternatively, when the LCS and protocol related data is transmitted as a response to network triggering, the MTC device 100 may implicitly understand that the network congestion is resolved. Thus, in this case, the MTC device 100 may stop the MM back-off timer.

Meanwhile, according to the second embodiment, the Uplink NAS Generic Transport message may include an indication to indicate that the LCS and protocol related data needs promptly transmitting or an indication to indicate that the LCS and protocol related data is the response to network triggering.

The first embodiment and second embodiment are summarized as follows.

1) The MTC device 100 is set to dual priority or multi-level priority in which the MTC device 100 operates in either of low priority and normal priority. When the MTC device 100 which is operating in low priority has small data to transmit, such as monitoring data, a response to a trigger from a network and an SMS used to transmit small data, or LCS and protocol related data to transmit, the MTC device 100 switches to the normal priority and transmits the small data, such as monitoring data, the response to the trigger from the network and the SMS used to transmit small data, or the LCS and protocol related data via an Uplink NAS Transport message or Uplink NAS Generic Transport message, overriding or stopping an MM back-off timer or extended wait timer if the timers are operating.

2) When the MTC device 100 has small data to transmit, such as monitoring data, a response to a trigger from a network and an SMS used to transmit small data, or LCS and protocol related data to transmit while the MM back-off timer or extended wait timer are operating, the MTC device 100 overrides or stops the operating timers and transmits the small data, such as monitoring data, the response to the trigger from the network and the SMS used to transmit small data, or the LCS and protocol related data via the Uplink NAS Transport message or Uplink NAS Generic Transport message.

The details described above may be implemented by hardware, which will be described with reference to FIG. 15.

Figure 15:
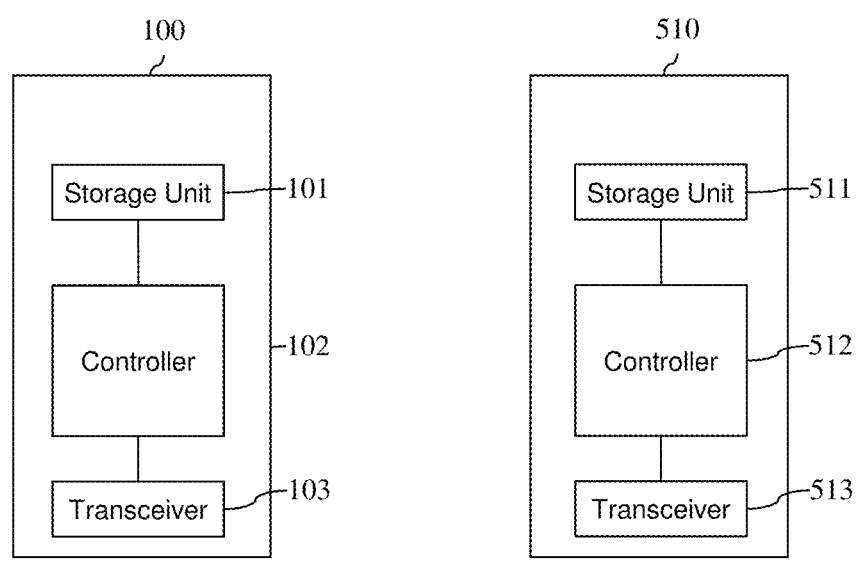
FIG. 15 is a block diagram showing a structure of an MTC device 100 and an MME/SGSN 510 according to an embodiment of the present invention.

FIG. 15 is a block diagram showing a structure of an MTC device 100 and an MME/SGSN 510 according to an embodiment of the present invention.

As shown in FIG. 15, the MTC device 100 includes a storage element 101, a controller 102, and a transceiver 103. Further, the MME/SGSN 510 includes a storage element 511, a controller 512, and a transceiver 513.

The storage elements 101 and 511 store the method of FIG. 6 to FIG. 14.

The controllers 102 and 512 control the storage elements 101 and 511 and the transceivers 103 and 513. More specifically, the controllers 102 and 512 respectively execute the aforementioned methods stored in the storage elements 101 and 511. Further, the controllers 102 and 512 transmit the aforementioned signals via the transceivers 103 and 513.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method for transmitting data of a machine type communication (MTC) device, the method comprising:
   receiving, by the MTC device, a mobility management (MM) back-off timer and a session management (SM) back-off timer;
   starting the MM back-off timer and the SM back-off timer;
   determining whether data to be transmitted is pending before the MM back-off timer expires;
   generating a short message service (SMS) based message including the data, when the SM back-off timer is not running or expires and when the MM back-off timer is running; and
   transmitting the SMS message when the SM back-off timer is not running and when the MM back-off timer is running,
   wherein a MM request message is not allowed to be transmitted until the MM back-off timer expires or is stopped, and
   wherein the SMS based message and a SM request message are not allowed to be transmitted until the SM back-off timer expires or is stopped.

2. The method of claim 1, wherein the transmitting comprises stopping the MM back-off timer even though the MM back-off timer does not expire.

3. The method of claim 1, wherein the transmitting comprises overriding the MM back-off timer even though the MM back-off timer does not expire.

4. The method of claim 1, wherein the data to be transmitted is a monitoring data, a response to a trigger from the network, or location service (LCS) and protocol related data.

5. The method of claim 1, further comprising:
   encapsulating the SMS message into an uplink NAS transport message.

6. The method of claim 1, further comprising receiving a configuration for multi-level priority allowing operation in either of low priority and normal priority.

7. The method of claim 6, further comprising:
   switching from the low priority to the normal priority.

8. A machine type communication (MTC) device comprising:
a reception unit to receive a mobility management (MM) back-off timer and a session management (SM) back-off timer;
a processor that:
starts the MM back-off timer and the SM back-off timer,
determines whether data to transmit is pending before the MM back-off timer expires, and
generates a short message service (SMS) based message including the data,
when the SM back-off timer is not running or expires and when the MM back-off timer is running; and
a transmission unit to transmit the SMS message when the SM back-off timer is not running and when the MM back-off timer is running,
wherein a MM request message is not allowed to be transmitted until the MM back-off timer expires or is stopped, and
wherein the SMS based message and a SM request message are not allowed to be transmitted until the SM back-off timer expires or is stopped.

9. The method of claim 1, wherein the SMS message includes an indication indicating that the data is a small amount of data.

10. The method of claim 1, further comprising
instructing, by a NAS layer of the MTC device, a radio resource control (RRC) layer not to apply an extended access barring (EAB) to a transmission of a RRC message, which is required to transmit the SMS message.

11. The method of claim 1, wherein the MM request message includes at least one of an attach request message, a tracking area update (TAU) request message and a routing area update (RAU) request message.

12. The method of claim 1, wherein the SM request message includes a packet data network (PDN) connectivity request message.

* * * * *